United States Patent Office 3,759,906
Patented Sept. 18, 1973

3,759,906
ACETYLENICALLY UNSATURATED DIARYL NITRILES AND DERIVATIVES THEREOF
John F. Cavalla, Isleworth, Gillian M. Sandison, Datchet, and Alan C. White, Windsor, England, assignors to John Wyeth & Brother Limited, Maidenhead, England
No Drawing. Application Nov. 18, 1969, Ser. No. 877,840, now Patent No. 3,594,401, which is a continuation-in-part of abandoned application Ser. No. 619,207, Feb. 28, 1967. Divided and this application Feb. 18, 1971, Ser. No. 116,617
Claims priority, application Great Britain, Mar. 3, 1966, 9,319/66
Int. Cl. C07d 87/36, 87/42
U.S. Cl. 260—247                                     12 Claims

ABSTRACT OF THE DISCLOSURE

Certain diaryl-substituted acetylenically unsaturated compounds bearing a cyano, carboxylic acid, ester, or amide substituent or hydroxymethyl or aminomethyl, and optionally an amino substituent, exhibit useful CNS activity as anticonvulsants and are also useful as anti-inflammatory agents and tranquillizers, etc.

---

This application is a division of our co-pending application Ser. No. 877,840, filed Nov. 18, 1969, now U.S. Pat. No. 3,594,401, which was itself a continuation-in-part of Ser. No. 619,207, filed Feb. 28, 1967, now abandoned.

This invention relates to novel acetylenically unsaturated compounds.

The Merck Index (1960), p. 380, discloses diphenyl acetic acid and derivatives thereof, namely the methyl and ethyl esters, the amide, nitrile, chloride and anhydride. These compounds do not apparently exhibit any pharmacological activity. The Journal of Medicinal Chemistry, 8 (1965), p. 313 discloses a compound related to the above-mentioned nitrile, namely 2-benzyl-2-(3-methoxyphenyl)-acetonitrile which also apparently does not exhibit pharmacological activity.

We have now found a new series of compounds, which may be considered as derivatives of the above-mentioned nitriles, and which are interesting chemical intermediates or have surprising pharmacological activity.

The present invention provides acetylenic compounds of the general formula:

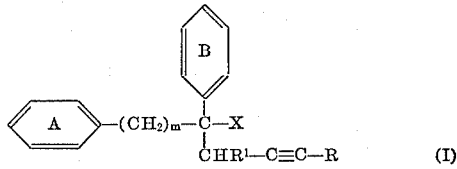

in which rings A and B are substituted or unsubstituted, $m$ is 0 or 1, X is a cyano radical, an unsubstituted, monosubstituted or disubstituted carbonamido radical, a carboxylic acid or salt thereof, a carboxylic acid ester radical, an aminomethyl radical, or a hydroxymethyl radical, $R^1$ is a hydrogen atom or a methyl radical and R is a hydrogen atom or a primary, secondary or preferably tertiary aminomethyl radical (i.e. —CH$_2$—N< with the —CH$_2$— group linked to the acetylenically unsaturated carbon atom), provided, that R can be hydrogen only when X is not a cyano radical.

When the acetylenic compounds of the above general formula contain a basic nitrogen atom, they can form acid addition salts, and the invention also provides these salts as novel compounds. The acid addition salts may be prepared by reacting the free base with an acid.

The compounds of the above general formula show interesting pharmacological activity and/or are intermediates in the preparation of similar compounds, which show pharmacological activity. They are also useful for testing pharmacological action in laboratory animals.

In general compounds of the above general formula showed action on the central nervous system when tested in animals, e.g., rats or mice. In general, they exhibit anticonvulsant activity. Additionally, certain of the compounds displayed one or more of the following activities, namely, anti-inflammatory activity, prolongation of barbiturate sleeping time, depressant activity, anorexic activity, analgesic activity, and anti-reserpine activity.

The rings A and B are unsubstituted or are substituted by suitable substituents, for example, alkoxy radicals (preferably methoxy or ethoxy), aralkyloxy (e.g., benzyloxy), halogen (e.g., chlorine) or alkyl (e.g., methyl or ethyl). Compounds in which both rings are unsubstituted or in which ring B contains a m-methoxy radical are particularly interesting.

The radical —CHR$^1$— is a branched or straight chained alkylene radical (i.e., R$^1$ is a methyl radical or a hydrogen atom respectively).

One preferred group of compounds are those in which R is hydrogen, though other interesting compounds are those in which R is a tertiary aminomethyl radical. In these latter compounds, the radical R can be a

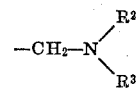

radical in which R$^2$ and R$^3$ each is a lower alkyl (e.g., containing 1 to 4 carbon atoms) or an aralkyl radical or together form a heterocyclic ring which may, if desired, contain further hetero atoms and which may be substituted, e.g., by alkyl radicals. Thus, R$^2$ and R$^3$ preferably are methyl, ethyl or benzyl or, when R$^2$ and R$^3$ form a ring, preferred radicals

are pyrrolidino, morpholino, piperidino and 4-methyl and 4-phenyl piperazino radicals.

Preferred starting materials for the preparation of the novel compounds of this invention are compounds having the formula:

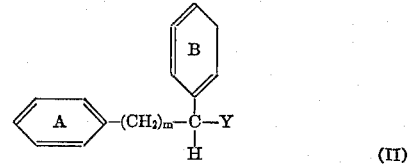

in which A, B, and $m$ have the meanings defined above, and Y is a cyano radical or a carboalkoxy radical, preferably a cyano radical. Such starting materials may be metallated by reaction with a solution or suspension of an alkali metal amide or hydride in an inert solvent, such as liquid ammonia, toluene, benzene, dimethoxy ethane, or dimethyl formamide at temperatures of from 20° C. to 80° C., preferably about room temperature. The metallated derivatives may then be allowed to react with a compound of the general formula $$\text{Hal—CHR}^1\text{—C}\equiv\text{CH} \qquad (III)$$

in which Hal is a halogen atom and R$^1$ has the meaning defined above. Preferably, Hal is chlorine or bromine; examples of suitable halogen compounds for this purpose are propargyl bromide and 3-chloro-but-1-yne.

This reactant of general Formula III may be added after cooling the solution of the metallated derivative of a compound of general Formula II to between —20 and +20° C. This reaction can be effected very conveniently at room temperature though other suitable temperatures can be used, e.g., 0 to 40° C. Subsequent addition of water enables the alkali metal halide formed to be separated from the organic solution which may then be worked up in known manner. From such a reaction there may be obtained intermediates of formula

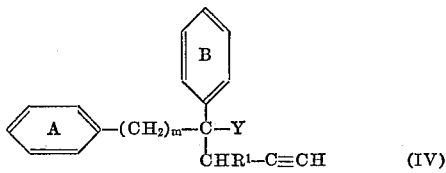

(IV)

which may be readily converted to the novel compounds of this invention by the methods described and exemplified below. (The compounds of Formula IV may be contaminated with the corresponding allene and so further purification may sometimes be necessary or desirable.)

Compounds of general Formula I in which R is hydrogen and X is other than cyano or ester groupings can be obtained by subsequent treatment of the nitrile or ester, as will be described below.

To prepare the compound of general Formula I containing an aminomethyl radical as substituent R, a Mannich reaction is carried out on the compound of general Formula I in which R is a hydrogen atom under the usual conditions for a Mannich reaction. For this purpose, the compound of general Formula I in which R is hydrogen can be reacted with formaldehyde (e.g., as paraformaldehyde) and the appropriate secondary amine of the general formula

(in which $R^2$ and $R^3$ have the meanings defined above). The solution preferably contains mercuric acetate or cuprous chloride. A particularly suitable inert solvent for the reaction in dioxane. Heating at temperatures of 30 to 120° C., e.g., on a steam bath is very convenient. The desired product may be worked up in known manner. However, the compound which undergoes the Mannich reaction advantageously should contain a free active hydrogen atom only as the substituent R on the acetylenic carbon atom. Accordingly, if the desired final product is to contain other reactive hydrogen atoms, these advisably should either be blocked on the reactant before the Mannich reaction is carried out, or formed in the appropriate position on the product of the Mannich reaction. Thus, when a compound is to be prepared in which X is other than a cyano or ester group, it is usually necessary to prepare the corresponding nitrile or ester of general Formula I and only then to convert the cyano or ester grouping to the desired group, as is more fully described below. If a nitrile (i.e., X is a —CN radical) is obtained by the above sequence of reactions, it can be converted to the corresponding primary amide (i.e., X is —CONH$_2$) for example by hydrolysis with hydrogen peroxide containing a caustic alkali, for example sodium hydroxide. The acid (i.e., X is —CO$_2$H) can be obtained by hydrolysis of the primary amide or ester, in acid solution. The acid can be converted to the secondary or tertiary amide by reaction with the appropriate amine, e.g., with an alkylamine. Alternatively, if desired the nitrile can be reduced with a reducing agent which will not attack a triple bond, for example with lithium aluminum hydride, to the amine (X then becomes a —CH$_2$NH$_2$ radical).

If an ester is obtained by the above sequence of reaction it can, if desired, be saponified to the acid or reacted with an amine to give the amide. Furthermore, the ester may be reduced, if desired, to the primary alcohol.

The initial unsubstituted starting materials of general Formula II, in which X is cyano can be prepared as follows:

When $m$ is 0 in the compounds of general Formula II, a Friedel-Crafts reaction can be effected between benzene and α-bromobenzyl nitrile. When $m$ is 1 in the compound of general Formula II benzyl nitrile can be condensed with benzaldehyde and the product reduced. When a substituted starting material is required, the benzene rings can be substituted at the appropriate positions by radicals which are inert in the above reaction. The other starting materials of this type can be made in similar manner or can be derived from the nitriles.

As stated above, the compounds of the invention generally have interesting pharmacological properties, and the present invention also provides pharmaceutical compositions comprising compounds of general Formula I, or a pharmaceutically acceptable acid addition or quaternary ammonium salt thereof (when the compound contains a basic nitrogen atom), and a pharmaceutical carrier. These may be administered orally or parenterally.

The pharmaceutically acceptable carrier used in the composition of the invention can be solid or liquid. Solid compositions include powders, tablets, dispersible granules, capsules, cachets and suppositories. A solid carrier can be one or more substances which may also act as flavouring agents, binders or tablets disintegrating agents; it can also be an encapsulating material. In powders the carrier is a finely-divided solid which is in admixture with the finely-divided active compound. In tablets the active compound is mixed with carrier having the necessary binding properties in suitable proportions and compacted in the size and shape desired. The powders and tablets preferably contain 5 or 10 to 99% of the active compound. Suitable solid carriers are, for example, magnesium carbonate or stearate, talc, sugar, lactose, pectin, dextrin, starch, gelatin, tragacanth, methyl cellulose, a low melting wax and cocoa butter. The term "composition" is intended to include the formulation of the active compound with encapsulating material as carrier to give a capsule in which the active compound (with or without carriers) is thus in association with it. Similarly, cachets are included.

Liquid form compositions include solutions, suspensions or emulsions. The active compound may be dissolved or suspended in a pharmaceutically acceptable liquid carrier, such as sterile water preferably containing a non-ionic surface active agent such as the esters, e.g., fatty acid esters of polyhydroxy compounds, e.g., sorbitan, and particularly their polyethylene oxide derivatives for instance Tween 80. (Tween is a registered trademark.) It may be dissolved in an organic solvent or a mixture thereof and it may contain flavouring agents or other substances.

Conveniently the composition is in a sterile form suitable for parenteral injection.

The active compound can be dispersed, e.g., dissolved in a suitable organic solvent, for instance aqueous propylene glycol or polyethylene glycol. In other instances compositions can be made by dispersing the finely-divided active compound in aqueous starch in sodium carboxymethyl cellulose solution: or in a suitable oil, for instance arachis oil. Liquid pharmaceutical compositions which are sterile solutions or suspensions can be utilized by intramuscular, intraperitoneal, subcutaneous or intraveneous injection.

In unit dose form the composition can be a packaged composition, the package containing discrete quantities of composition, for example, packeted powders or vials or ampoules. The unit dosage form can be a capsule, cachet or tablet itself, or it can be the appropriate number of any of these in packaged form.

To prepare a composition in unit dosage form in accordance with the invention, the active compound can be mixed with a carrier and divided into unit dosage form. However, if desired the active compound can be used in the absence of a carrier.

The following examples illustrate the invention.

EXAMPLE 1

1-cyano-1,1-diphenyl-3-butyne (a) Diphenyl acetonitrile (193 g., 1.0 mole) in dry toluene (400 ml.) was added dropwise with stirring to a suspension of sodamide (39.2 g., 1.0 mole) in toluene (100 ml.). After a small quantity of the diphenyl acetonitrile had been added the reaction mixture was gently warmed to initiate the mildly exothermic reaction evolving ammonia. The reaction temperature was controlled by adjusting the rate of addition of the diphenyl acetonitrile.

(b) When the addition had been completed the reaction mixture was heated under reflux for 1 hour, cooled to 10° C. and 3-bromo-1-propyne (130 g., 1.1 moles) in toluene (50 mls.) was added. The reaction mixture was maintained at between 10 and 15° C. by external cooling. On completion of the addition the reaction mixture was left for several hours at room temperature. Water (100 ml.) was cautiously added. The organic phase was separated and washed with 2 N HCl. After drying the organic phase over anhydrous magnesium sulphate, the solvent was removed under reduced pressure to leave a red oil which crystallized from 90% ethanol as yellow rhombs of melting point 61° C. Recrystallization from 95% methanol (after purification using charcoal) yielded 160 g. (70%) of colorless needles, M.P. 63–64° C.

EXAMPLE 2

1-cyano-1,1-diphenyl-2-methyl-3-butyne (a) 1,1-diphenyl acetonitrile (51.5 g., 0.26 mole) in toluene (100 ml.) was added with stirring to a suspension of sodamide (11.7 g., 0.3 mole) in toluene (20 ml.). On warming, a red suspension of the sodium salt of the nitrile was formed.

(b) The reaction mixture was heated under reflux for 1 hour, then cooled to 10° C. 3-chloro-1-butyne (28.0 g., 0.31 mole) was added dropwise when an exothermic reaction took place; the reaction temperature was maintained between 10–15° C. by external cooling. On completion of the addition, the reaction mixture was left overnight, at room temperature, then washed with water to give a red oil which was distilled at 176–200° C. and 0.2 mm. when 52.0 g. (80%) of the desired compound were obtained. This was crystallized from absolute ethanol to give white rhombs (24.3 g., 37%).

Analysis for $C_{18}H_{15}N$: Found (percent): C, 88.2; H, 6.2; N, 5.9. Requires (percent): C, 88.1; H, 6.2; N, 5.7.

EXAMPLE 3

1-benzyl-1-cyano-1-phenyl-3-butyne (a) 1-phenyl-1-benzyl-acetonitrile (20.7 g., 0.1 m.) in dry toluene (40 ml.) was reacted with sodamide (4.2 g., 0.11 m.) in dry toluene (10 ml.) in the manner described in Example 1.

(b) 3-bromo-1-propyne (11.8 g., 0.1 mole) in toluene (50 mls.) was reacted with the product in the manner described in Example 1. After working up as described in that example, 1-benzyl-1-cyano-1-phenyl-3-butyne was obtained as colorless rhombs of melting point 75–6° C. after recrystallization from aqueous methanol. Yield 14.5 g. (60%).

Analysis for $C_{18}H_{15}N$: Found (percent): C, 88.0; H, 6.0; N, 5.7. Requires (percent): C, 88.2; H, 6.2; N, 5.7.

EXAMPLE 4

1-benzyl-1-cyano-1-(m-methoxyphenyl)-3-butyne (a) 1-benzyl-1-(m-methoxyphenyl)-acetonitrile (23.7 g., 0.1 mole) in dry toluene (50 mls.) was reacted with sodamide (4.2 g., 0.11 mole) in toluene (10 ml.) in the manner described in Example 1.

(b) 3-bromo-1-propyne (13.0 g., 0.11 mole) in toluene (50 mls.) was reacted with the product in the manner described in Example 1. After working up as described in that Example, 1-benzyl-1-cyano-1-(m-methoxyphenyl)-3-butyne was obtained as colorless rhombs of melting point 92–3° C. after recrystallization from aqueous methanol. Yield 11.0 g.

Analysis for $C_{19}H_{17}NO$: Found (percent): 83.0; H, 6.3; N, 5.3. Requires (percent): C, 82.9; H, 6.4; N, 5.1.

EXAMPLE 5

Ethyl-2,2-diphenyl-4-pentynoate (a) Ethyl 1,1-diphenyl acetate (0.15 mole, 36 g.) in dry dimethyl formamide (75 mls.) was added to a stirred suspension of sodium hydride (0.15 mole, 7.2 g. of 50% dispersion in oil) in dimethyl formamide (50 mls.). An exothermic reaction occurred and the reaction mixture which became yellow in color was maintained between 20–25° C. by external cooling.

(b) On completion of the addition, the reaction mixture was stirred for a further 3 hours at room temperature, cooled to 15° C. and 3-bromo-1-propyne (19.1 g., 0.16 mole) added dropwise keeping the temperature between 20–30° C. by external cooling. The reaction mixture was left overnight at room temperature and had a pH of 7. The sodium bromide was filtered off and the dimethyl formamide was removed under reduced pressure to leave an oil which was taken up in benzene and washed with water. After drying once over anhydrous magnesium sulphate, the product was distilled to yield the ester, B.P. 140–141° C. at 0.5 mm. Yield 19.4 g. (50%) of a colorless oil of $[n]_D^{20}$ 1.5642.

Analysis for $C_{19}H_{18}O_2$: Found (percent): C, 81.8; H, 6.4. Requires (percent): C, 82.0; H, 6.5.

EXAMPLE 6

2,2-diphenyl-4-pentynoic acid

Ethyl 2,2-diphenyl-4-pentynoate (4.17 g.) was heated under reflux with potassium hydroxide (2.8 g.) in 50% ethanol (40 ml.) until all the oil had gone into solution. The ethanol was removed under reduced pressure and the residual oil extracted with ether. The aqueous, basic, solution was acidified with concentrated hydrochloric acid and re-extracted with ether. After drying, the ether was removed to leave a white solid which after recrystallization from benzene/petrol afforded 2.15 g. of fine white needles, M.P. 181–182° C.

Analysis for $C_{17}H_{14}O_2$: Found (percent): C, 80.7; H, 5.7. Requires (percent): C, 81.6; H, 5.6.

EXAMPLE 7

1,1-diphenyl-3-butyne-1-carboxamide

The product of Example 1 (23 g., 0.1 mole) in ethanol (600 ml.) was added to a stirred solution of 30% hydrogen peroxide (180 mls.) and N-sodium hydroxide (600 mls.). The mixture was stirred at room temperature for 168 hours, left at 0° C. for 24 hours and the white amorphous material filtered off to yield 21 g. (89%), M.P. 160–167° C. Recrystallization from benzene/petroleum ether afforded colorless rhombs, M.P. 163–164° C.

Analysis for $C_{17}H_{15}NO$: Found (percent): C, 81.5; H, 5.8; N, 5.6. Requires (percent): C, 8.19; H, 6.0; N, 5.6.

This compounds exhibits activity against metrazol seizures and showed anticonvulsant activity in an amount of about 1/10 of its $LD_{50}$ i.p. in mice which was 561 mg./kg.

EXAMPLE 8

1,1-diphenyl-2-methyl-3-butyne-1-carboxamide 1-cyano-1,1-diphenyl-2-methyl-3-butyne (5.83 g., 0.023 mole) in ethanol (200 ml.) was stirred for 168 hours at room temperature with a mixture of hydrogen peroxide (30%, 43 mls.) and N-sodium hydroxide (138 mls.). At the end of this time the solid material remaining was removed by filtration and 3.44 g. of starting material obtained. Evaporation of the mother liquors afforded 1.0 g.

i.e., 16% of the carboxamide as colorless rhombs, M.P. 150–151° C. Recrystallization from benzene and petrol (B.P. 80–100° C.) raised the M.P. to 151–2° C.

Analysis for $C_{18}H_{17}NO$: Found (percent): C, 82.3; H, 6.7; N, 5.5. Requires (percent): C, 82.1; H, 6.5; N, 5.3.

EXAMPLE 9

1-amino-2,2-diphenyl-4-pentyne 1-cyano-1,1-diphenyl-3-butyne (9.2 g., 0.04 mole) in dry diethyl ether (120 mls.) was added dropwise to a stirred suspension of lithium aluminum hydride (2.4 g., 0.06 mole) in diethyl ether (200 mls.) at such a rate that gentle refluxing occurred. On completion of the addition the stirred mixture, from which a white complex had separated, was heated under reflux for a further 2 hours.

The mixture was cooled and the complex decomposed by the cautious addition of water (15 mls.), the suspension was stirred for 30 minutes then filtered. The filtrate was evaporated to dryness to leave a colorless oil which deposited microneedles on treatment in isopropanol with a solution of hydrogen chloride in dry ether; 7.4 g. (68%), M.P. 199–202° C. Recrystallization from isopropanol afforded colorless needles, M.P. 204–6° C. (d.).

Analysis for $C_{17}H_{18}ClN$: Found (percent): C, 74.7; H, 6.8; N, 5.4; Cl, 13.25. Requires (percent): C, 75.1; H, 6.7; N, 5.15; Cl, 13.1.

This compound exhibited anti-reserpine properties in both ptosis and hypothermia tests. It also showed anorexic activity, analgesic activity, potentiated the action of barbiturates, and depressed polysynaptic refluxes in a cat. The $LD_{50}$ i.p. in mice was 105 mg./kg.

EXAMPLE 10

1-benzyl-1-(m-methoxyphenyl)-3-butyne-1-carboxamide 1-benzyl-1-(m-methoxyphenyl)-1-cyano-3-butyne (5.5 g., 0.2 mole) in ethanol (150 mls.) was reacted with 30% hydrogen peroxide (60 mls., 0.3 m.) and 2 N-sodium hydroxide (60 mls., 0.12 m.) by the procedure of Example 7.

After recrystallization from petrol (B.P. 80–100° C.) benzene/ether mixture (1:1:1 by volume), 1-benzyl-1-(m-methoxyphenyl)-(3-butyne)-1-carboxamide (6.4 g., 78.5%) of melting point 106–110° C. was obtained.

EXAMPLE 11

1-benzyl-1-phenyl-3-butyne-1-carboxamide 1-benzyl-1-phenyl-1-cyano-3-butyne (4.9 g.) in ethanol (150 mls.) was reacted with a stirred solution of 30% hydrogen peroxide (35 mls.) and 2 N-sodium hydroxide (160 mls.) by the procedure of Example 7 to give 1-benzyl-1-phenyl-3-butyne-1-carboxamide having melting point 147–8° C.

Administered orally, this compound protects mice against metrazol-induced convulsions. The $ED_{50}$ is 80 mg./kg., and the $LD_{50}$ is 290 mg./kg.

EXAMPLE 12

2,2-diphenyl-4-pentyne-1-ol

Ethyl 2,2-diphenyl-4-pentynoate (7.75 g., 0.03 mole) in dry diethyl ether (50 mls.) was added dropwise to a stirred suspension of lithium aluminum hydride (1.14 g., 0.03 mole) in dry ether (50 mls.). On completion of the addition the reaction mixture was heated under reflux for 2½ hours, then cooled and decomposed by the dropwise addition of water (5 ml.). The mixture was stirred refluxed for 30 minutes then filtered, and the ether removed and the product distilled to yield a cloudy viscous oil, B.P. 122–130° C. at 0.05 mm. (5.0 g., 70%).

Analysis for $C_{17}H_{16}O$: Found (percent): C, 84.8; H, 6.9; active hydrogen 0.8. Requires (percent): C, 86.4; H, 6.8; active hydrogen 0.75.

Administered intraperitoneally, this compound protects against metrazol-induced convulsions in mice. The $ED_{50}$ is 127 mg./kg., and the $LD_{50}$ is in excess of 1000 mg./kg.

EXAMPLE 13

2-benzyl-2-phenyl-4-pentynamine 2-benzyl-2-phenyl-4-pentynenitrile (12.25 g.) in dry ether (100 mls.) was added dropwise to a stirred suspension of aluminum lithium hydride (3.8 g.) in ether (100 mls.). On completion of addition the mixture was heated under reflux for 2 hours. After cooling, the reaction mixture was decomposed by the addition of water, magnesium sulphate was added and the mixture filtered. The ether was removed under reduced pressure to leave a colorless oil. The oil was dissolved in propan-2-ol and a solution of hydrogen chloride in dry ether added. The title compound was obtained as a monohydrate (5.6 g.), M.P. 164–165° C.

Analysis for $C_{18}H_{19}N.H_2O \cdot HCl$: Found (percent): C, 71.4; H, 7.4; N, 4.4; Cl, 11.55. Requires (percent): C, 71.1; H, 7.3; N, 4.6; Cl, 11.7.

This compound protects against metrazol-induced convulsions in mice.

EXAMPLE 14

2-benzyl-2-(m-methoxyphenyl)-4-pentynenitrile 2-(m-methoxyphenyl)-3-phenyl-propionitrile (23.7 g.) in dry toluene (50 mls.) was added dropwise to a suspension of sodium amide (4.2 g.) in toluene (200 ml.). On completion of the addition the mixture was heated under reflux for 2 hours. The reaction mixture was cooled and 3-bromo-1-propyne (9 ml.) was added dropwise keeping the temperature of the reaction below 10° C. The reaction mixture was left overnight and then poured into water. After drying, the organic phase on evaporation afforded crystals from ethanol, 11.0 g., M.P. 92–3° C.

Analysis for $C_{19}H_{17}NO$: Found (percent): C, 83.0; H, 6.3; N, 5.3. Requires (percent): C, 82.9; H, 6.4; N, 5.1.

EXAMPLE 15

2-(o-chlorophenyl)-2-phenyl-4-pentynenitrile 2-(o-chlorophenyl)-phenylacetonitrile (5.0 g.) in dry dimethyl formamide (5 mls.) was added to a suspension of sodium hydride (1.0 g., 50% in oil) in dry dimethyl formamide (10 ml.). After stirring at room temperature for 1 hour the reaction mixture was cooled to 10° C. and 3-bromo-1-propyne (2.9 g.) added dropwise. The reaction mixture was stirred for 2 hours, poured into water and extracted with benzene. The benzene extracts were washed with water, dried and evaporated to an oil which gave 3.4 g. of white chunky crystals, M.P. 99–100° C. from methanol.

Analysis for $C_{17}H_{12}NCl$: Found (percent): C, 77.3; H, 4.6; N, 5.3; Cl, 13.0. Requires (percent): C, 76.8; H, 4.55; N, 5.3; Cl, 13.3.

This compound is an anticonvulsant.

EXAMPLE 16

2,2-diphenyl-4-phenyl-4-pentynoic-acid dimethylaminoethylester

Ethyl 2,2-diphenyl-4-pentynoate (13.9 g.) and dimethyl aminoethanol (50 mls.) were dissolved in dry benzene (100 mls.) and heated to reflux temperature. A small pea of sodium was added and the benzene/ethanol azeotrope removed through a fractionating column filled with single-turn glass helices. When the theoretical amount of azeotrope had separated, the benzene and excess dimethylamine and ethanol were removed under reduced pressure and the residue dissolved in 2 N hydrochloric acid and extracted with ether. The aqueous layer was basified and extracted with ether. After drying, the ether was removed to leave a viscous oil. Distillation afforded 9.8 g. of a colorless viscous oil, B.P./0.07 mm. 148° C.

Analysis for $C_{21}H_{23}NO_2$: Found (percent): C, 78.4; H, 7.2; N, 4.4. Requires (percent): C, 78.5; H, 7.2; N, 4.4.

This compound has anticonvulsant activity.

EXAMPLE 17

5-cyano-5,5-diphenyl-1-piperidino-2-pentyne 1-cyano - 1,1 - diphenyl - 3 - butyne (22 g., 0.1 mole) in dioxane (100 ml.) was heated on a steam bath for 2 hours with paraformaldehyde (3.6 g., 0.04 mole), piperidine (8.8 g., 0.12 mole) and cuprous chloride (120 mg.). The dioxane was removed by distillation and the residue dissolved in ether and extracted with 2 N hydrochloric acid. The aqueous layer was basified, extracted with ether, dried over anhydrous magnesium sulphate and evaporated to yield the desired Mannich base as an oil. On treatment with hydrogen chloride in ether the hydrochloride was obtained as a crystalline solid. After recrystallization from isopropyl alcohol/ether 23.1 grams 66% were obtained of melting point 215–216° C.

Analysis for $C_{23}H_{25}N_2Cl$: Found (percent): C, 76.2; H, 7.0; N, 7.6; Cl, 9.3. Requires (percent): C, 76.5; H, 7.0; N, 7.6; Cl, 9.8.

This compound gave protection against metrazol-induced convulsions in mice at approximately 1/10 its $LD_{50}$ when given interperitoneally. The $LD_{50}$ i.p. in mice was 270 mg./kg.

EXAMPLE 18

5-cyano-5,5-diphenyl-1-diethylamino-2-pentyne

1 - cyano - 1,1 - diphenyl - 3 - butyne (11.0 g., 0.05 mole) in dioxane (50 ml.) was reacted with paraformaldehyde (1.8 g., 0.02 mole) and diethylamine (4.4 g., 0.06 mole) by heating on a steam bath for 2 hours in the presence of a catalytic quantity of cuprous chloride.

The desired Mannich base (13.88 g., 85%) was isolated from the reaction mixture by the usual method in the form of its crystaline hydrochloride. After crystallization from isopropyl alcohol/ether, 12.6 grams were obtained having melting point 193° C.

Analysis for $C_{22}H_{25}N_2Cl$: Found (percent): C, 75.1; H, 7.2; N, 8.0; Cl, 9.7. Requires (percent): C, 74.9; H, 7.1; N, 7.7; Cl, 10.05.

The compound gave significant protection against metrazol-induced and maximal electroshock induced convulsions in mice and showed analgesic activity at 1/4 of its $LD_{50}$. The $LD_{50}$ i.p. in mice was 168 mg./kg.

EXAMPLE 19

5-cyano-5,5-diphenyl-1-benzylmethylamino-2-pentyne 1-cyano-1,1-diphenyl-3-butyne (11.0 g.) in dioxane (50 mls.) was reacted with paraformaldehyde (1.8 g.) and benzylmethylamine (9.2 g., 0.3 mole) in the manner described in Example 17.

The desired Mannich base (11 g., 55%) was obtained in the form of its crystalline hydrochloride.

After recrystallization from isopropyl alcohol/ether 10.62 grams were obtained having a melting point 221° C.

Analysis for: $C_{27}H_{29}N_2Cl$: Found (percent): C, 77.3; H, 6.5; N, 6.8; Cl, 9.4.

Requires (percent): C, 77.8; H, 6.3; N, 7.0; Cl, 8.8.

This compound more than doubled the barbiturate sleeping time of mice when administered intraperitoneally at 40 mg./kg. The $LD_{50}$ i.p. in mice was more than 1000 mg./kg. The compound also protected against metrazol-induced convulsions in mice.

EXAMPLE 20

5-cyano-5,5-diphenyl-1-morpholino-2-pentyne 1-cyano-1,1-diphenyl-3-butyne (11.0 g.) in dioxane (100 mls.) was reacted in the manner described in Example 16 with paraformaldehyde (1.8 g.), morpholine (6.0 g.) and cuprous chloride (100 mg.) and worked up in the manner described in that example. The desired Mannich base was obtained in the form of its crystalline hydrochloride.

After recrystallization from isopropyl alcohol/ether, 8.5 g. of 5-cyano-5,5-diphenyl-1-morpholino-2-pentyne, monohydrochloride were obtained having melting point 221° C.

Analysis for: $C_{22}H_{22}N_2O \cdot HCl$: Found (percent): C, 71.8; H, 6.0; N, 7.3; Cl, 9.25.

Requires (percent): C, 72.0; H, 6.3; N, 7.6; Cl, 9.7.

The $LD_{50}$ i.p. in mice was 630 mg./kg. The compound protects mice against metrazol-induced convulsions, exhibiting an $ED_{50}$ of 260 mg./kg. when administered intraperitoneally.

EXAMPLE 21

5-cyano-5,5-diphenyl-1-pyrrolidino-2-pentyne 1-cyano-1,1-diphenyl-3-butyne (9.3 g.) in dioxane (100 ml.) was reacted in the manner described in Example 17 with paraformaldehyde (1.38 g.), pyrrolidine (3.1 g.), and cuprous chloride (100 mg.) and worked up in the manner described in that example.

The desired Mannich base was obtained in the form of its crystalline hydrochloride. Yield 43%, M.P. 204–5° C.

Analysis for: $C_{22}H_{22}N_2HCl$: Found (percent): C, 75.4; H, 6.2; N, 8.0; Cl, 11.35.

Requires (percent): C, 75.5; H, 6.3; N, 8.0; Cl, 11.4.

This compound showed anticonvulsant activity and depressant activity when administered intraperitoneally at 1/4 of its $LD_{50}$. It doubled the hexabarbital sleeping time in mice at a dose of 60 mg./kg. The $LD_{50}$ in mice was 137 mg./kg.

EXAMPLE 22

5-cyano-5,5-diphenyl-1-(4-methyl-piperazino)-2-pentyne 1-cyano-1,1-diphenyl-3-butyne (11 g., 0.05 mole) in dioxane (50 ml.) was reacted with paraformaldehyde (1.8 g., 0.02 mole) and N-methyl-piperazine (6.0 g., 0.06 mole) in the manner described in Example 17. The desired Mannich base in the form of its dihydrochloride (14.3 g., 75%) was obtained as a crystalline solid, M.P. 230–232° C.

Analysis for: $C_{23}H_{27}N_3Cl_2$: Found (percent): C, 66.1; H, 6.9; N, 9.9; Cl, 16.9.

Requires (percent): C, 66.3; H, 6.5; N, 10.1; Cl, 17.0.

This compound showed anticonvulsant activity in giving protection against metrazol-induced convulsions ($ED_{50}=80$ mg./kg.) and maximal electroshock seizures. The $LD_{50}$ i.p. in mice was 227 mg./kg.

EXAMPLE 23

1-piperidino-5-cyano-5-benzyl-5-(m-methoxyphenyl)-2-pentyne

1 - benzyl-1-cyano-1-(m-methoxyphenyl)-3-butyne (6.6 grams, 0.025 mole) in dioxane (50 mls.) was heated on a steam bath with paraformaldehyde (1.2 g.) piperidine (3.0 g.) and cuprous chloride, (40 mg.). The dioxane was removed by distillation and the residue dissolved in ether and extracted with 2 N-hydrochloric acid. The aqueous layer was basified, extracted with ether, the ether extracts dried over magnesium sulphate and evaporated to yield the desired Mannich base (6.0 g., 66%) in the form of its crystalline hydrochloride, M.P. 170° C.

Analysis for: $C_{25}H_{30}N_2OCl$: Found (percent): C, 73.3; H, 7.2; N, 6.9; Cl, 8.5.

Requires (percent): C, 73.4; H, 7.15; N, 6.85; Cl, 8.7.

The $LD_{50}$ i.p. in mice was 250 mg./kg. The compound protects against metrazol-induced convulsions in mice.

EXAMPLE 24

1-diethylamino-4-methyl-5-cyano-5,5-diphenyl-2-pentyne 1-cyano-2-methyl-1,1-diphenyl-3-butyne (6.3 g., 0.025 mole) in dioxane (50 mls.) was heated on a steam bath with paraformaldehyde (1.1 g.), diethylamine (2.2 g., 0.03 mole) and cuprous chloride (70 mg.) for 6 hours. The dioxane was removed by distillation and the residue was dissolved in ether and extracted with 2 N-hydrochloric acid. The aqueous extracts were basified, extracted with ether, dried over magnesium sulphate and evaporated to yield the desired Mannich base isolated in the form of its hydrochloride 5.05 g. (61%), M.P. 169–170° C.

Analysis for $C_{23}H_{26}N_2HCl$: Found (percent): C, 75.0; H, 7.6; N, 7.5; Cl, 9.5. Requires (percent): C, 75.3; H, 7.4; N, 7.6; Cl, 7.9.

The compound protects against metrazol-induced convulsions in mice; $ED_{50}$ (intraperitoneally)=60 mg./kg., $LD_{50}$=445.

EXAMPLE 25

5-benzyl-5-cyano-5-(m-methoxyphenyl)-1-(4-methyl-piperazino)-2-pentyne 1-cyano-(1-benzyl-1-(m-methoxyphenyl) - 3 - butyne (5.5 g.) in dioxane (50 mls.) was heated on a steam bath with paraformaldehyde (0.72 g., 0.02 mole), N-methylpiperazine (3 g., 0.03 mole) and cuprous chloride (60 mg.). The dioxane was removed by distillation and the residue dissoved in ether and extracted with dilute hydrochloric acid. The aqueous layer was basified, extracted with ether, the extracts dried over magnesium sulphate and evaporated to yield the desired Mannich base (6.4 g., 74.3%) isolated in the form of its crystalline dihydrochloride, M.P. 202–208° C. (decomp.).

Analysis for $C_{25}H_{31}Cl_2N_3O$: Found (percent): C, 65.1; H, 7.0; N, 8.95; Cl, 15.3. Requires (percent): C, 65.2; H, 6.8; N, 9.1; Cl, 15.4.

The compound protects against metrazol-induced convulsions in mice. $ED_{50}$=40 mg./kg. (p.o.), $LD_{50}$=177 mg./kg.

EXAMPLE 26

5-cyano-5-benzyl-5-phenyl-1-(4-methylpiperazino)-2-pentyne 1-cyano-1-benzyl - 1 - phenyl - 3 - butyne (4.9 g., 0.02 mole) in dioxane (50 mls.) was heated on a steam bath with paraformaldehyde (0.72 g., 0.02 mole), N-methylpiperazine (3 g., 0.03 mole) and cuprous chloride (60 mg.). The dioxane was removed by distillation and the residue dissolved in ether and extracted with dilute hydrochloric acid. The aqueous layer was basified, extracted with ether, the extracts dried over magnesium sulphate and evaporated to yield the desired Mannich base (4.7 g., 54.5%) isolated in the form of its crystalline dihydrochoride, M.P. 208–212° C. (decomp.).

Analysis for $C_{24}H_{27}N_3 \cdot 2HCl \cdot H_2O$: Found (percent): C, 64.8; H, 7.1; N, 9.2; Cl, 15.8. Requires (percent): C, 64.3; H, 7.0; N, 9.4; Cl, 15.8.

This compound protects against metrazol-induced convulsions in mice. The $ED_{50}$ (intraperitoneally) is 84 mg./kg. and the $LD_{50}$ is 198 mg./kg.

EXAMPLE 27

5-cyano-5,5-diphenyl-4-methyl-1-morpholino-2-pentyne 1-cyano-2-methyl-1,1-diphenyl-3-butyne (10.3 g., 0.042 mole) was heated in a steam bath for 4 hours with paraformaldehyde (1.35 g., 0.045 mole), morpholine (4.1 g., 0.047 mole) and cuprous chloride (100 mg.). The reaction was worked up as described in Example 17 to yield the Mannich base as the hydrochloride. Yield 8.7 g., M.P. 194–6° C. Recrystallization from isopropyl alcohol/diethyl ether afforded 7.41 g. (46%), M.P. 198–200° C.

Analysis for $C_{23}H_{24}N_2O \cdot HCl$: Found (percent): C, 72.3; H, 6.6; Cl, 9.3; N, 7.3. Requires (percent): C, 72.5; H, 6.6; Cl, 9.3; N, 7.35.

This compound protects ($ED_{50}$, p.o.=400 mg./kg.) against metrazol-induced convulsions in mice. $LD_{50}$=>1000 mg./kg.

EXAMPLE 28

4-methyl-5-cyano-5,5-diphenyl-1-piperidino-2-pentyne 1-cyano-2-methyl-1,1-diphenyl-3-butyne (5.34 g.) was heated on a steam bath with paraformaldehyde (0.9 g.), piperidine (2.1 g.) and cuprous chloride (70 mg.) in dioxane (25 mls.) for 4 hours working up as described in Example 17. Yield 3.6 g. of the hydrochloride monohydrate. Recrystallization from isopropyl alcohol gave 3.2 g. of colorless needles, M.P. 220–223° C.

Analysis for $C_{24}H_{26}N_2HCl \cdot H_2O$: Found (percent): C, 74.2; H, 7.1; N, 7.1; Cl, 9.0. Requires (percent): C, 74.1; H, 7.4; N, 7.2; Cl, 9.1.

The compound protects against metrazol-induced convulsions in mice.

EXAMPLE 29

Ethyl-2,2-diphenyl-6-piperidino-4-hexynoate

Ethyl-2,2-diphenyl-4-pentynoate (13.9 g., 0.05 mole) was heated on a steam bath for 6 hours, with piperidine (8.25 mls., 0.06 mole), paraformaldehyde (1.8 g., 0.1 mole) and cuprous chloride (50 mg.) in dioxane (100 mls.). The dioxane was removed under reduced pressure to leave a brown viscous oil which was dissolved in dilute hydrochloric acid and extracted with ether. The aqueous layer was basified and extracted with ether. The ether extracts were dried over anhydrous magnesium sulphate the ether removed under reduced pressure and the oil distilled, B.P. 170–176° C. at 0.05 mm. (7.72 g.), $[n]_D^{20}$ 1.5589.

Analysis for $C_{25}H_{29}NO_2$: Found (percent): C, 79.9; H, 7.7; N, 3.9. Requires (percent): C, 78.0; H, 7.8; N, 3.7.

The compound, administered intraperitoneally, protects against metrazol-induced convulsions in mice. $ED_{50}$=40, $LD_{50}$=574.

EXAMPLE 30

2,2-diphenyl-6-(4-phenyl-piperazinyl)-4-hexyne-nitrile 2,2 - diphenyl-4-pentynenitrile (11 g.), paraformaldehyde (1.8 g.), 1-phenylpiperazine (9.72 g.), cuprous chloride (120 mg.) and dioxane (100 mls.) was heated on a steam bath for 1.5 hours. The dioxane was removed under reduced pressure leaving an oil which was dissolved in 2 N hydrochloric acid and extracted with ether. The yellow solid obtained was filtered, dissolved in hot propan-2-ol and the solution acidified with concentrated hydrochloric acid. 10.3 g. of the hydrochloride were obtained, M.P. 214–216° C.

Analysis for $C_{28}H_{27}N_3 \cdot HCl$: Found (percent): C, 76.2; H, 6.3; N, 9.4; Cl, 7.9. Requires (percent): C, 76.0; H, 6.4; N, 9.5; Cl, 8.0.

Ths compound is a very effective anticonvulsant, as shown by it having a median effective dose against metrazol-induced convulsions of 40 mg./kg., whereas is median lethal dose is in excess of 1000 mg./kg.

EXAMPLE 31

6-(benzylmethylamino)-2,2-diphenyl-4-hexynamide

6 - (benzylmethylamino)-2,2-diphenyl-4-pentynenitrile (10 g.) was stirred at room temperature with 30% hydrogen peroxide (45 mls.) and N sodium hydroxide (250 mls.) in ethanol (200 mls.). The ethanol was removed under reduced pressure and the residual oil extracted into benzene. After drying, the benzene was removed under reduced pressure to leave an oil which was crystallized from propan-2-ol affording 5.3 g. of colorless crystals, M.P. 105–6° C.

Analysis for $C_{26}H_{24}N_2O$: Found (percent): C, 81.7; H, 6.7; N, 7.4. Requires (percent): C, 82.0; H, 6.7; N, 7.45.

This compound shows anticonvulsant activity when tested in mice against metrazol-induced convulsions.

EXAMPLE 32

Ethyl-6-diethylamino-2,2-diphenyl-4-hexynoate

Ethyl 2,2-diphenyl-4-pentynoate (41 g.), diethylamine (9.15 g.) and paraformaldehyde (3.7 g.) was heated on a steam bath in dioxane (100 ml.) containing cuprous bromide (120 mg.), for 2 hours. The dioxane was removed under reduced pressure and the oil dissolved in 2 N hydrochloric acid. After the acid layer had been extracted with ether it was basified with 2 N sodium hydroxide. The oil was extracted with ether, dried, and after drying evaporated to yield an oil which was distilled affording 30.1 g. of oil, B.P./0.3 mm. 185–90° C.

Analysis for $C_{24}H_{29}NO_2$: Found (percent): C, 79.0; H, 7.85; N, 4.0. Requires (percent): C, 79.3; H, 8.0; N, 3.85.

This compound protects mice against metrazol-induced convulsions, showing an $ED_{50}$ (i.p.) of 40 mg./kg. and an $LD_{50}$ of 314 mg./kg.

EXAMPLE 33

6-diethylamino-2,2-diphenyl-4-hexyne-1-ol

Ethyl 6-diethylamino-2,2-diphenyl-4-hexynoate (4.7 g.) in dry ether (50 ml.) was added dropwise to a stirred suspension of aluminum lithium hydride (0.52 g.) in dry ether (50 mls.). The reaction was heated under reflux for 2 hours. After cooling, the complex was decomposed by the addition of water (5 mls.). Anhydrous magnesium sulphate was added and the mixture filtered. Evaporation of the ether left an oil which after triturating with benzene/light petroleum gave 1.31 g. of crystals, M.P. 96–97° C.

Analysis for $C_{22}H_{27}NO$: Found (percent): C, 81.6; H, 8.6; N, 4.5 Requires (percent): C, 81.51; H, 8.8; N, 4.5.

This compound provides protection against metrazol-induced convulsions in mice. The $ED_{50}$ (i.p.) is 60 mg./kg. and the $LD_{50}$ more than 400 mg./kg.

What is claimed is:

1. A compound having the formula

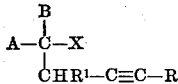

in which A is a member of the group consisting of phenyl and benzyl, B is a member of the group consisting of phenyl and methoxyphenyl, $R^1$ is a member of the group consisting of hydrogen and methyl, X is a member of the group consisting of cyano and carboethoxy, and R is a member of the group consisting of pyrrolidinomethyl, piperidinomethyl, morpholinomethyl, piperazinomethyl, 4-methylpiperazinomethyl and 4-phenylpiperazinomethyl.

2. A compound according to claim 1 which is 5-cyano-5,5-diphenyl-1-piperidino-2-pentyne.

3. A compound according to claim 1 which is 5-cyano-5,5-diphenyl-1-morpholino-2-pentyne.

4. A compound according to claim 1 which is 5-cyano-5,5-diphenyl-1-pyrrolidino-2-pentyne.

5. A compound according to claim 1 which is 5-cyano-5,5-diphenyl-1-(4-methylpiperazino)-2-pentyne.

6. A compound according to claim 1 which is 1-piperidino-5-cyano-5-benzyl-5-(m-methoxyphenyl)-2-pentyne.

7. A compound according to claim 1 which is 5-benzyl-5-cyano-5-(m-methoxyphenyl)-1-(4-methylpiperazino-2-pentyne.

8. A compound according to claim 1 which is 5-cyano-5-benzyl-5-phenyl-1-(4-methylpiperazino)-2-pentyne.

9. A compound according to claim 1 which is 5-cyano-5,5-diphenyl-4-methyl-1-morpholino-2-pentyne.

10. A compound according to claim 1 which is 4-methyl-5-cyano-5,5-diphenyl-1-piperidino-2-pentyne.

11. A compound according to claim 1 which is ethyl-2,2-diphenyl-6-piperidino-4-hexynoate.

12. A compound according to claim 1 which is 2,2-diphenyl-6-(4-phenylpiperazinyl)-4-hexynenitrile.

No references cited.

ALEX MAZEL, Primary Examiner

J. TOVAR, Assistant Examiner

U.S. Cl. X.R.

260—247.2 A, 247.2 B, 247 AC, 268 CN, 268 Ph, 293.75, 293.76, 293.81, 326.3, 326.5 M, 326,62, 465 E, 465 K, 465 F, 469, 471 A, 472, 473 G, 558 A, 559 D, 570 R, 570.6, 618 E; 424—248